United States Patent [19]

Ales et al.

[11] Patent Number: 4,751,042
[45] Date of Patent: Jun. 14, 1988

[54] REMOVABLE CONTROL ROD DRIVE SHAFT GUIDE

[75] Inventors: Matthew W. Ales, Amherst; Steve K. Brown, Lynchburg; Larry D. Dixon, Forest, all of Va.

[73] Assignee: The Babcock & Wilcox Company, New Orleans, La.

[21] Appl. No.: 830,776

[22] Filed: Feb. 18, 1986

[51] Int. Cl.⁴ .................... G21C 7/00; F16B 9/02
[52] U.S. Cl. ..................... 376/353; 376/463; 285/320; 403/197
[58] Field of Search ............... 376/353, 463; 285/320, 285/317, 194, 162; 403/197, 195, 194, 201

[56] References Cited

U.S. PATENT DOCUMENTS

| | | | |
|---|---|---|---|
| 763,317 | 6/1904 | Nelson | 285/320 |
| 3,041,089 | 6/1962 | Purves | 285/320 |
| 3,700,112 | 10/1972 | Maeshiba | 285/317 X |
| 4,444,419 | 4/1984 | Maeshiba | 285/320 X |
| 4,627,760 | 12/1986 | Yagi et al. | 403/194 X |
| 4,637,914 | 1/1987 | Boyle et al. | 376/353 |

Primary Examiner—John F. Terapane
Assistant Examiner—John S. Maples
Attorney, Agent, or Firm—Robert J. Edwards; D. Neil LaHaye

[57] ABSTRACT

A flexureless insert guide assembly. An annular shaped body inserted through the hole in a guide structure card has spring loaded arms pivotally mounted in the body which snap outward to retain the assembly in place. The assembly has an exterior groove adapted to receive removal tooling which causes retraction of the arms for removal of the assembly.

1 Claim, 2 Drawing Sheets

REMOVABLE CONTROL ROD DRIVE SHAFT GUIDE

BACKGROUND OF THE INVENTION

1. Field of the Invention

The invention relates to nuclear reactors and more particularly to improved control rod drive shaft guides.

2. General Background

In reactors such as those made by Westinghouse, the control rod drive shaft guide consists of a monolithic ring centered by the through hole in the top card of the control rod guide structure. The guide is held in place by four bayonet-like devices which are attached to the card. Conical heads on the bayonet-like devices are pushed aside as the ring is installed and snapped over the edge of the ring to hold it down. In this design, the bayonet-like devices are highly stressed during operation due to differential thermal expansion and are prone to damage during the installation and removal of the ring. As a result of these various stresses, many of the bayonet-like devices in operating nuclear reactors become bent, cracked or broken.

Several patents in the known art present guide structures.

U.S. Pat. No. 4,326,921 entitled "Control Rod Guide Thimble for Nuclear Reactor Fuel Assemblies" teaches improved control rod guide thimbles which include insets which project inwardly from the guide thimble to reduce control rod end vibrations during operation and thus reduce thimble wear.

U.S. Pat. No. 4,030,975 entitled "Fuel Assembly for a Nuclear Reactor" teaches a threaded connection formed between the upper and/or lower alignment posts and the guide tubes which clamps the fuel assembly end plate therebetween.

U.S. Pat. No. 4,313,796 entitled "Guide Post Modification for Nuclear Fuel Assembly" teaches an improved guide tube post which decreases the flow induced vibration of a cylindrical control rod suspended therethrough. The inner wall of the post, near where it exits into a diffuser region, is provided with a polygonal cross section.

U.S. Pats. No. 4,208,248 entitled "Fuel Assembly With a Removable End Fitting" and 4,321,111 entitled "Industrial Technique" teach a fuel assembly having a removable end fitting.

The above patents do not provide for elimination of highly stressed materials in the retention of the drive shaft guide and immunity to damage of the guide during installation or removal.

SUMMARY OF THE INVENTION

The present invention solves the above problems in a straightforward manner. What is provided is a flexureless insert assembly designed to replace the original ring and bayonet arrangement while fulfilling the same guide functions as the original part. The assembly is inserted through the center hole in the control rod guide structure top card. Spring loaded arms snap outward beneath the card to retain the guide assembly in place. The guide assembly may be removed by removal tooling which attaches to the guide at a reduced diameter section near its upper end.

In view of the above, it is an object of the present invention to provide a drive shaft guide resistant to damage during installation or removal.

It is another object of the present invention to provide a drive shaft guide which is not highly stressed during operation.

In view of the above objects, it is a feature of the present invention to provide a guide assembly which fits easily into the apertures in a control rod guide structure card.

It is another feature of the invention to provide locking arms on the guide assembly which clamp the guide assembly in place.

BRIEF DESCRIPTION OF THE DRAWINGS

For a further understanding of the nature and objects of the present invention, reference should be had to the following description taken in conjunction with the accompanying drawings in which like parts are given like reference numerals and, wherein.

DETAILED DESCRIPTION OF THE PREFERRED EMBODIMENT

Figure 1:
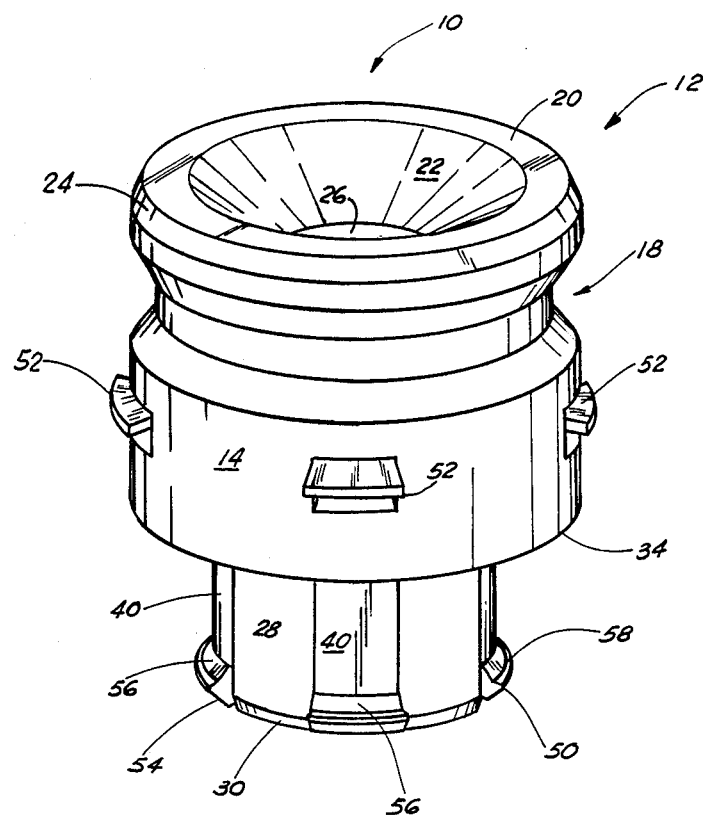
FIG. 1 is a perspective view of the guide assembly.
Figure 2:
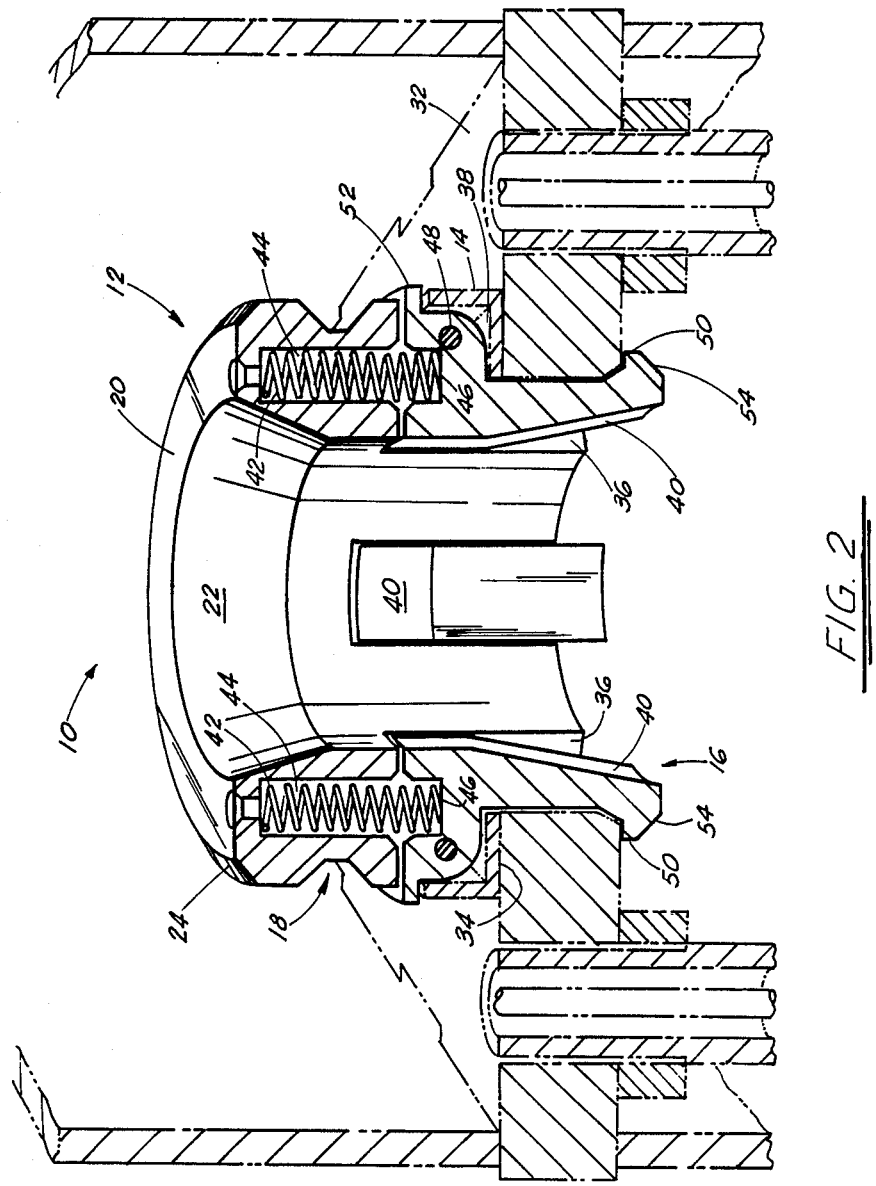
FIG. 2 is a side sectional view of the assembly as it appears installed.

Referring to the drawings, it is seen that the invention is generally referred to by the numeral 10. Guide assembly 10 is substantially annular shaped and comprised of main body portion 12, shoulder portion 14, and means 16 for releasably locking assembly 10 in its installed position. In FIG. 1, it can be seen that main body portion 12 is slightly smaller in diameter near its upper end than shoulder portion 14. The purpose of this is to provide for the use of removal tooling for removal and/or replacement of guide assembly 10.

Main body portion 12 is provided with means for receiving removal tooling such as a reduced outer diameter to form exterior groove 18 around its circumference between top surface 20 and shoulder portion 14. Main body portion 12 is also provided at its upper end with beveled interior edge 22 and first beveled exterior edge 24. Beveled interior edge 22 allows easier insertion of the control rod drive shaft into central bore 26 through main body portion 12 by serving as means for guiding the control rod drive shaft. First exterior beveled edge 24 acts in cooperative association with exterior grove 18 for receiving removal tooling by providing an edge with a natural tendency to center the removal tooling over guide assembly 10 as it makes contact and guides the removal tooling toward groove 18 for attachment to main body portion 12.

As best seen in FIG. 1, main body portion 12 has a reduced outer diameter at its lower end 28 below shoulder portion 14 and is provided with second exterior beveled edge 30. Beveled edge 30 serves to help guide lower end 28 into the aperture in card 32 of the control rod drive structure. It can be seen that shoulder portion 14 has an outer diameter slightly larger than the upper section of main body portion 12 and has a substantially flat bottom edge 34 to serve as means of support for main body portion 12 on card 32.

Lower end 28 is provided with a plurality of slots 36 spaced around the circumference in communication with substantially radial bores 38 in shoulder portion 14. Slots 36 and radial bores 38 are adapted to receive locking means 16 therein.

Locking means 16 is comprised of locking arms 40 and coil springs 42. Coil springs 42 are received in axial bores 44 and bear against an indented or notched upper surface 46 of locking arms 40 to urge locking arms 40 into their first normal locking position. Locking arms 40 are pivotally mounted in bores 38 by means of pins 48 and provided with lower locking tabs 50 and means for moving locking arms 40 into their second release position such as upper release tabs 52. As best seen in FIG. 1, lower locking tabs 50 are provided with exterior beveled edge 54 and interior beveled edge 56. Exterior beveled edge 54 serves to prevent tab 50 from catching or hanging up on card 32 and also to pivot locking arms 40 toward the second release position when guide assembly 10 is being inserted.

The radial force of interior beveled edge 56 against the bottom corner of card 32 is provided by the pressure of spring 42 on locking arm 40 and serves as the primary force which retains assembly 10 in place under the hydraulic loads normally encountered in nuclear reactors. Lip 58 on each arm 40 prevents the removal of assembly 10 without first disengaging arms 40 by means of removal tooling. To achieve the release and removal of assembly 10, removal tooling not shown is attached to assembly 10 by means of exterior groove 18 and caused to depress tabs 52, thereby moving arms 40 into their second release position wherein lower locking tabs 50 are disengaged from the lower side of card 32. The removal tooling and guide assembly 10 are then removed.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed is:

1. A removable control rod drive shaft guide for a control rod "guide" structure card, comprising:
   a. a substantially annular shaped main body portion having a central axial bore for receiving a control rod drive shaft and an upper exterior groove for receiving removal tooling;
   b. said main body portion having a reduced outer diameter at its lower section;
   c. a shoulder portion integral with said main body portion for supporting said main body portion on the guide structure card;
   d. said shoulder portion having a substantially radial bore and said reduced outer diameter lower section having a slot in alignment with said radial bore;
   e. a locking arm "pivotaly" mounted in said radial bore which protrudes into said slot and is movable between a first normal locking position for engaging the guide structure card and a second release position;
   f. a spring received within a second axial bore in said main body portion and biased against said locking arm for urging said locking arm into said first normal locking position; and
   g. a release tab at one end of said locking arm for moving said locking arm into said second release position.

* * * * *